United States Patent
Liu

(10) Patent No.: US 8,218,415 B2
(45) Date of Patent: Jul. 10, 2012

(54) LASER POWER CONTROL SYSTEM AND METHOD USED IN OPTICAL DISC WRITER

(75) Inventor: Chi-Yuan Liu, Hsinchu (TW)

(73) Assignee: Lite-On It Corp., Taipei (TW)

(*) Notice: Subject to any disclaimer, the term of this patent is extended or adjusted under 35 U.S.C. 154(b) by 668 days.

(21) Appl. No.: 11/949,131

(22) Filed: Dec. 3, 2007

(65) Prior Publication Data
US 2008/0192594 A1  Aug. 14, 2008

(30) Foreign Application Priority Data

Feb. 14, 2007 (TW) .............................. 96105539 A

(51) Int. Cl.
*G11B 7/00* (2006.01)
(52) U.S. Cl. ..................................... 369/116; 369/47.51
(58) Field of Classification Search ............ 369/47.5, 369/116, 47.51, 47.52, 47.53, 13.26, 13.27, 369/13.28, 13.29
See application file for complete search history.

(56) References Cited

U.S. PATENT DOCUMENTS

| | | | |
|---|---|---|---|
| 2002/0001270 A1 | 1/2002 | Fukuchi et al. | |
| 2003/0007438 A1* | 1/2003 | Kim et al. | 369/53.26 |
| 2003/0193563 A1 | 10/2003 | Suzuki | |
| 2004/0008601 A1* | 1/2004 | Sasaki et al. | 369/59.11 |
| 2004/0047263 A1* | 3/2004 | Xang et al. | 369/53.26 |
| 2005/0089071 A1 | 4/2005 | Liu | |
| 2006/0077863 A1* | 4/2006 | Kuo et al. | 369/116 |
| 2006/0098543 A1 | 5/2006 | Hsu et al. | |
| 2008/0212426 A1 | 9/2008 | Endert et al. | |

FOREIGN PATENT DOCUMENTS
WO  0233793 A1  4/2002

* cited by examiner

*Primary Examiner* — Tan X Dinh
(74) *Attorney, Agent, or Firm* — WPAT., P.C.; Justin King

(57) ABSTRACT

A laser power control system and method used in an optical disc writer. According to a write power value, the laser power control system drives a laser to output a write power through a first channel. According to a proportional value, the laser power control system drives the laser to output an overdrive power through a second channel. By using a close loop control of the laser power control system, the write power and the overwrite power are independent of the temperature changes.

2 Claims, 4 Drawing Sheets

LASER POWER CONTROL SYSTEM AND METHOD USED IN OPTICAL DISC WRITER

FIELD OF THE INVENTION

The present invention relates to a laser power control system and a method used in an optical disc writer, and more particularly to a laser power control system and a method applied to an optical disc writer for controlling an overdrive power during a data writing process.

BACKGROUND OF THE INVENTION

A write strategy of an optical disc writer, and a driving signal of a pickup head to control a laser output power are closely related to the write quality of the recorded optical disc.

FIG. 1 depicts a diagram showing a write strategy of an optical disc writer in the prior art. Data formed on a spiral track of an optical disc comprises a plurality of marks (pits) and non-marks (lands). For forming a mark 10 on a track of an optical disc, a laser beam having a write power Pw is outputted from a laser diode of a pickup head, and is focused on the track of the optical disc. However, for heating the track in a relatively short time and for forming a more precise mark 10, an overdrive power Po must be superposed to the write power Pw in an initial period of forming the mark 10. In another word, if the overdrive power Po can be efficiently controlled to an accurate value, the jitter value of the recorded data can be reduced, so as the write quality of the recorded optical disc can be enhanced. Moreover, as depicted in FIG. 1, the read power Pr, outputted from the laser diode of the pickup head, is for reading the marks and non-marks on the tracks of the optical disc.

Before the data writing process of an optical disc writer, the write power Pw must be determined first via the optical disc writer executing an optimum power calibration in a power calibration area of the optical disc. After the write power Pw is determined, the write power Pw is maintained within a specific range via a close loop control in the optical disc writer.

FIG. 2 depicts a block diagram showing the configuration of a prior-art laser power control system. Generally, the optical disc writer uses a digital write power value to control the laser diode to output a write power Pw. Initially, the digital write power value is applied to the laser power control system and converted to an analog signal via a first digital-to-analog converter DAC 111. Then a compensator 12 generates a compensating signal according to the difference of the analog signal and a feedback signal, and outputs the compensating signal to a first laser driver LDD1 14. According to the compensating signal, the first laser driver LDD1 14 generates a first driving current I1. The first driving current I1 is then outputted to a laser diode LD 16 through a first channel CH1 for driving the laser diode LD 16 to output a predefined write power Pw. For maintaining the write power Pw within a specific range, there is a front monitor diode FMD 18 to detect the laser beam outputted from the laser diode LD 16, and then generates the feedback signal according to the power of the detected laser beam.

Moreover, for making the laser diode LD 16 capable of outputting an overdrive power Po, and to be superposed to the write power Pw within a specific period, a digital overdrive power value is provided. As depicted in FIG. 2, the digital overdrive power value is transferred to a second digital-to-analog converter DAC2 20, and converted to an analog signal to the second laser driver LDD2 22. The second laser driver LDD2 22 then outputs a second driving current I2 within a specific period according to the analog signal outputted from the second digital-to-analog converter DAC2 20. The second driving current I2 is then superposed to the laser diode LD 16 through a second channel CH2 for driving the laser diode LD 16 to output the predefined overdrive power Po.

Because the overdrive power Po is only outputted within a specific period and the period is relatively short, it is hard to maintain the overdrive power Po within a specific range via an open loop control in the optical disc writer. As depicted in FIG. 2, the prior-art optical disc writer uses the second laser driver LDD2 22 and the digital overdrive power value to control the second driving current I2 via an open loop control. That means the optical disc writer superposes the second driving current I2 to the first driving current I1 and outputs the summation current of the second driving current I2 and the first driving current I1 to drive the laser diode LD 16 in the specific period of forming the marks.

It is well understood that the temperature of the optical disc writer is gradually increasing during data writing process, and the laser power outputted from the laser diode is gradually decreasing if a fixed driving current is provided. Because the value of the first driving current I1 can be increased according to the increasing temperature due to the first driving current I1 is controlled by a close loop control, the write power Pw can be maintained within a specific range and is independent of the temperature changes. However, the overdrive power Po cannot be adjusted according to the change of the temperature due to the second driving current I2 is controlled by an open loop control. Therefore, the overdrive power Po outputted from the laser diode will gradually decrease along with the increasing temperature. Because the overdrive power Po cannot be maintained within a specific range, there is a potential that the jitter value may be increased, the write quality may be poor, and the data writing or data reading process may be even failed.

SUMMARY OF THE INVENTION

Therefore, the object of the present invention is to control the overdrive power Po precisely, so as the write quality can be maintained.

The present invention discloses a laser power control system used in an optical disc writer, comprising: a digital-to-analog converter, for receiving a write power value and converting the write power value to an analog signal; a compensator, for generating a compensating signal according to a difference of the analog signal and a feedback signal; a laser diode; a first laser driver, for generating a first driving current according to the compensating signal, and transferring the first driving current to the laser diode to output a laser beam having a write power; a proportional element having a proportional value, for receiving the compensating signal and outputting an output signal, wherein the output signal is the compensating signal multiplied by the proportional value; a second laser driver, for generating a second driving current according to the output signal, and outputting the second driving current to the laser diode, wherein the second driving current is superposed to the first driving current, and the laser diode outputs an overdrive power according to the second driving current; a front monitor diode, for detecting the power outputted from the laser diode, and generating the feedback signal according to the detected power.

Moreover, the present invention discloses a laser power control method used in an optical disc writer having a firmware capable of setting a write power value and a proportional value, comprising the steps of: driving a laser diode to output a write power through a first channel according to the write power value; and driving the laser diode to output an overdrive power through a second channel according to the proportional value.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
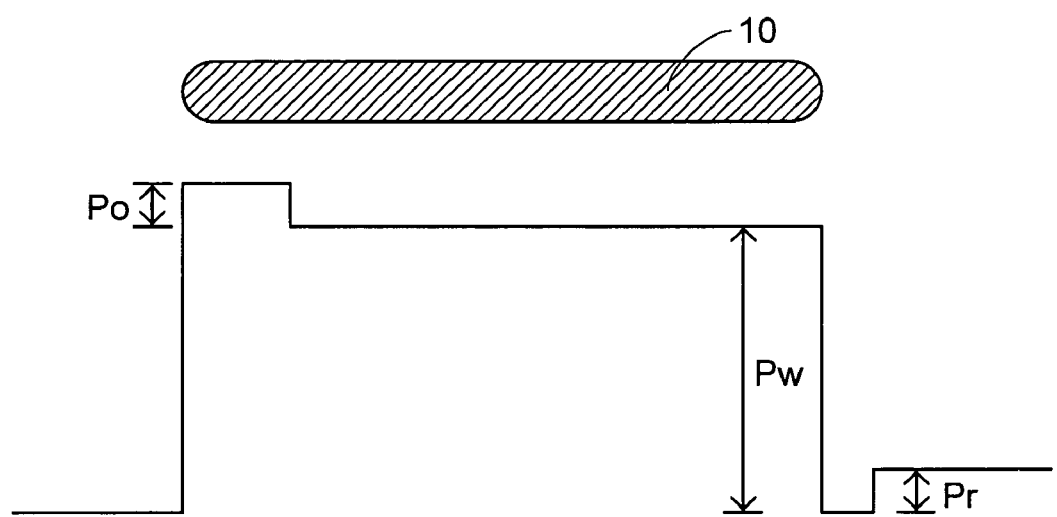
FIG. 1 is a diagram showing a write strategy utilized by a prior-art optical disc writer.
Figure 2:
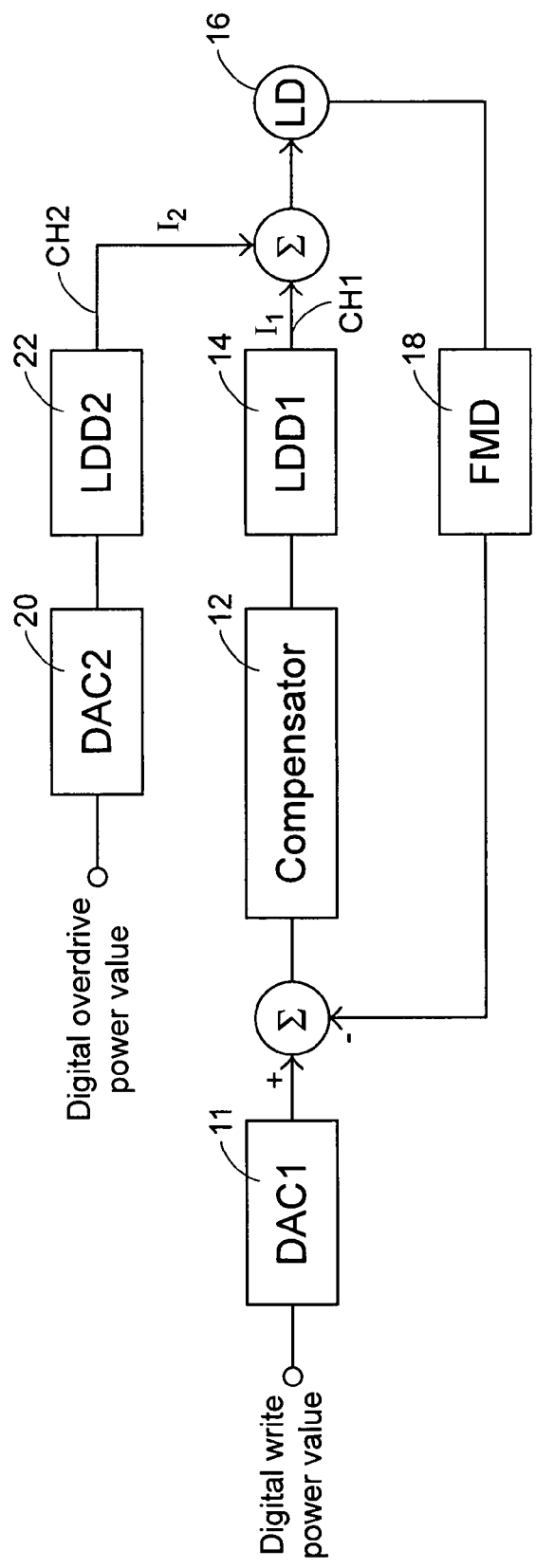
FIG. 2 is a block diagram showing the configuration of a prior-art laser power control system.
Figure 3:
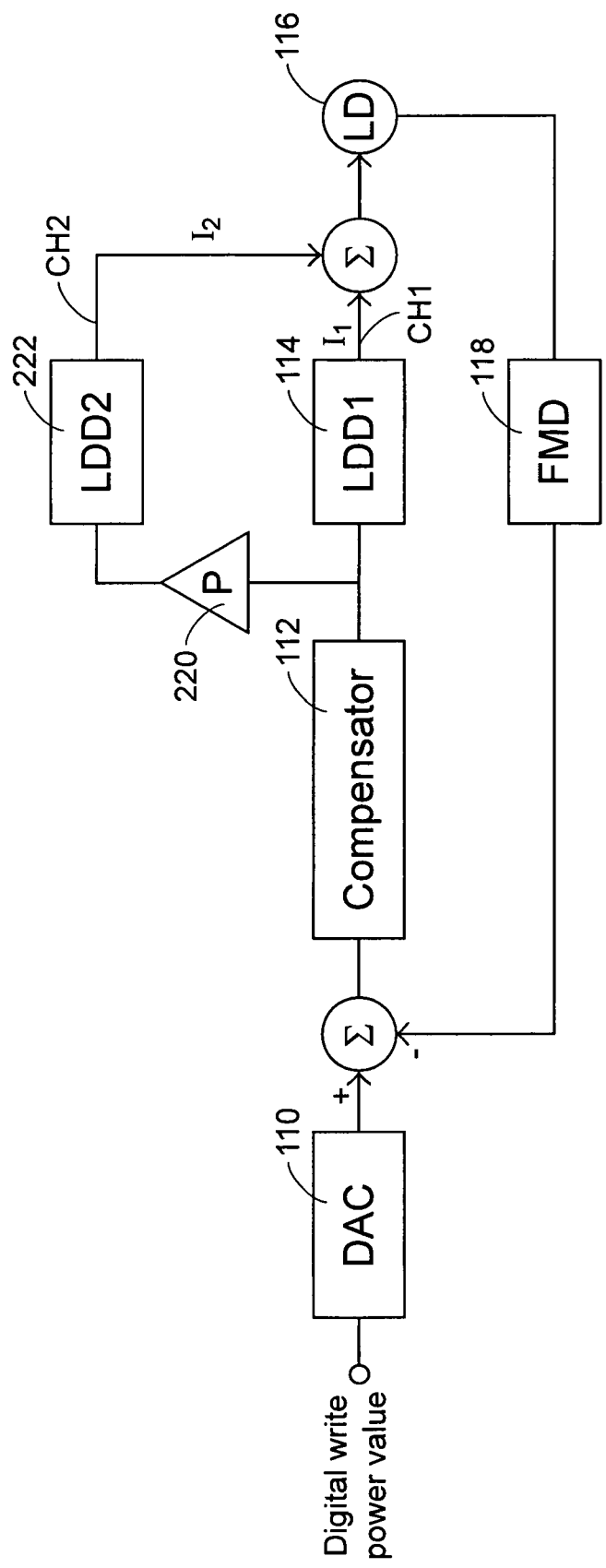
FIG. 3 is a block diagram showing the configuration of a laser power control system of the present invention.

FIG. 3 depicts a block diagram showing the configuration of a laser power control system of the present invention. Similarly, a digital write power value is applied to the laser power control system and converted to an analog signal via a first digital-to-analog converter DAC 1 110. Then a compensator 112 generates a compensating signal according to the difference of the analog signal and a feedback signal, and outputs the compensating signal to a first laser driver LDD1 114. According to the compensating signal, the first laser driver LDD1 114 generates a first driving current I1. The first driving current I1 is then outputted to a laser diode LD 116 through a first channel CH1 for driving the laser diode LD 116 to output a predefined write power Pw. For maintaining the write power Pw within a specific range, there is a front monitor diode FMD 118 to detect the laser beam outputted from the laser diode LD 116, and then generates the feedback signal according to the power of the detected laser beam.

Moreover, the present invention discloses a proportional element 220 for receiving the compensating signal, and multiplying the compensating signal by a predefined proportional value P, and then outputting the multiplied compensating signal to a second laser driver LDD2 222. The second laser driver LDD2 222 then generates a second driving current I2 according to the multiplied compensating signal. The second driving current I2 is then outputted to the laser diode LD 116 through a second channel CH2 for driving the laser diode LD 116 to output a predefined overdrive power Po.

Because of the proportional value P, which is set in the proportional element 220 through a firmware of the optical disc writer, the overdrive power Po has a proportional relationship with the write power Pw. In another word, when the write power Pw is maintained within a specific range due to the value of the first driving current I1 being capable of increasing along with the increasing temperature in response to a close loop control, the overdrive power Po is also maintained within a specific range due to the proportional value P. Therefore, the problem of the overdrive power Po which is decreased along with the increasing temperature can be avoided. The better jitter value of the recorded data can be maintained, so as the write quality of the recorded optical disc can be enhanced.

The above-mentioned laser power control system is capable of making the second driving current I2 to drive the laser diode LD 116 outputting a maintained overdrive power Po without decreasing the value of the second driving current I2 along with the increasing temperature. However, the overdrive power Po still may not be precisely controlled by the above-mentioned laser power control system due to the first channel CH1 and the second channel CH2 may have different gains. As depicted in FIG. 3, if the gain of the first channel CH1 and the gain of the second channel CH2 are different, the ratio of the real overdrive power Po and the real write power Pw outputted from the laser diode LD 116 will not equal to the proportional value P which is set in the proportional element 220.

For precisely controlling the overdrive power Po, the present invention provides an adjusting curve, wherein the adjusting curve can be generated via a practically measuring during the manufacture procedure in the factory, and then the adjusting curve can be stored in the memory of the optical disc writer.

Figure 4:
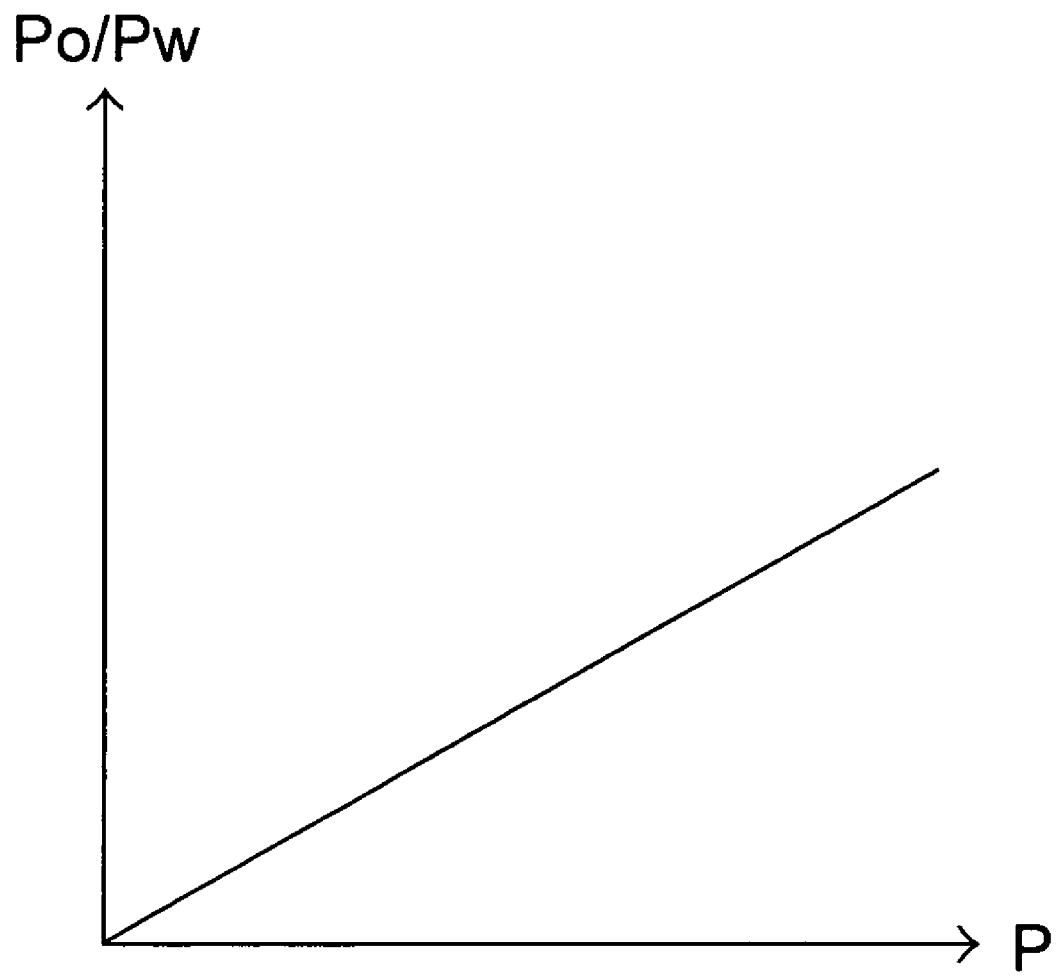
FIG. 4 is a diagram showing an adjusting curve of the present invention.

FIG. 4 depicts the adjusting curve of the present invention. For generating of the adjusting curve, a plurality of predefined proportional values is set in the proportional element 220 via a firmware of the optical disc writer. When one of the predefined proportional values set in the proportional element 220 is selected and a predefined write power value is applied to the optical disc writer, the real overdrive power Po and the real write power Pw outputted from the laser diode can be practically measured via a power meter. So as the ratio Po/Pw corresponding to the selected proportional value is obtained. After all the predefined proportional values are selected and the ratios Po/Pw corresponding to the predefined proportional values are obtained, the adjusting curve is generated. In another word, a precise overdrive power Po can be obtained according to the write power value, the proportional value P, and the adjusting curve when a data writing process is executed in the optical disc writer. And the overdrive power Po is also independent of the temperature changes. Therefore, the better jitter value can be maintained, so as the write quality of the recorded optical disc can be maintained.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A laser power control system used in an optical disc writer, comprising:
  a digital-to-analog converter, for receiving a write power value and converting the write power value to an analog signal;
  a compensator, for generating a compensating signal according to a difference of the analog signal and a feedback signal;
  a laser diode;
  a first laser driver, for generating a first driving current according to the compensating signal, and outputting the first driving current to the laser diode to output a laser beam having a write power;
  a proportional element having a proportional value, for receiving the compensating signal and outputting an output signal, wherein the output signal is the compensating signal multiplied by the proportional value;
  a second laser driver, for generating a second driving current according to the output signal, and outputting the second driving current to the laser diode and the laser diode outputs a laser beam having an overdrive power according to the second driving current;

a memory for storing an adjusting curve, wherein the adjusting curve represents a ratio of the overdrive power and the write power according to different proportional values; wherein the overdrive power is determined according to the write power value, the proportional value, and the adjusting curve, the overdrive power is proportional to the write power; and a front monitor diode, for detecting the power outputted from the laser diode, and generating the feedback signal according to the detected power.

2. A laser power control method used in an optical disc writer having a firmware capable of setting a write power value and a proportional value, comprising the steps of:

driving a laser diode to output a laser beam having a write power through a first channel according to the write power value;

providing an adjusting curve, wherein the adjusting curve represents a ratio between the overdrive power and the write power according to different proportional values; and determining the overdrive power according to the write power value, the proportional value, and the adjusting curve; and driving the laser diode to output a laser beam having an overdrive power through a second channel according to the proportional value, wherein the overdrive power is the write power multiplied by the proportional value.

* * * * *